United States Patent [19]

Takei

[11] 4,424,961

[45] Jan. 10, 1984

[54] ENGINE MOUNTING FOR SUSPENDING ENGINE RELATIVE TO VEHICLE STRUCTURE

[75] Inventor: Hirofumi Takei, Yokosuka, Japan

[73] Assignee: Nissan Motor Company, Limited, Yokohama, Japan

[21] Appl. No.: 261,374

[22] Filed: May 7, 1981

[30] Foreign Application Priority Data

May 9, 1980 [JP] Japan .................................. 55-61383
May 15, 1980 [JP] Japan .................................. 55-64318
May 15, 1980 [JP] Japan .................................. 55-64319

[51] Int. Cl.³ .............................................. F16F 9/04
[52] U.S. Cl. .................................. 267/64.27; 188/379; 267/35; 267/140.1; 267/141; 248/559; 248/562; 248/632
[58] Field of Search ............ 188/379; 267/8 R, 64.15, 267/64.27, 64.19, 64.24, 35, 63 R, 140.1, 141; 248/559, 562, 632

[56] References Cited

U.S. PATENT DOCUMENTS

| | | | |
|---|---|---|---|
| 2,115,072 | 4/1938 | Hunt et al. ................. | 267/64.19 X |
| 2,149,863 | 3/1939 | Olley ................................ | 280/95 R |
| 2,562,195 | 7/1951 | Lee ................................... | 267/140.1 |
| 2,683,016 | 7/1954 | Campbell ........................ | 267/140.1 |
| 2,773,686 | 12/1956 | Nash ............................... | 267/64.27 X |
| 2,976,962 | 3/1961 | Pegard ............................. | 188/298 |
| 3,137,466 | 7/1964 | Rasmussen ..................... | 248/562 |
| 3,368,807 | 2/1968 | Thrasher ........................ | 267/35 |

FOREIGN PATENT DOCUMENTS

| | | | |
|---|---|---|---|
| 723039 | 12/1965 | Canada ........................... | 267/140.1 |
| 6819 | 1/1980 | European Pat. Off. . | |
| 15378 | 1/1980 | European Pat. Off. . | |
| 446516 | 7/1927 | Fed. Rep. of Germany ... | 267/64.27 |
| 1081211 | 6/1954 | France . | |
| 1424313 | 11/1965 | France . | |
| 2435632 | 4/1980 | France . | |
| 54-156953 | 11/1979 | Japan ............................... | 267/64.27 |
| 470545 | 11/1936 | United Kingdom . | |
| 769144 | 10/1980 | U.S.S.R. ......................... | 267/63 R |

Primary Examiner—George E. A. Halvosa
Attorney, Agent, or Firm—Schwartz, Jeffery, Schwaab, Mack, Blumenthal & Koch

[57] ABSTRACT

An engine mounting for suspending an engine relative to a vehicle structure. The engine mounting comprises a first armature for connection to the engine and a second armature for connection to the vehicle structure and a bellows interposed between the first and second armature to define therewith a closed enclosure. The closed enclosure is filled with pressuzied gas. An inertia mass is mounted on the bellows. A mass of the inertia mass and an apparent spring constant of the bellows are selected such that the inertia mass vibrates in inverse phase relationship with the phase of vibration of the first armature when the engine operates within a vibration insulated domain.

4 Claims, 6 Drawing Figures

ENGINE MOUNTING FOR SUSPENDING ENGINE RELATIVE TO VEHICLE STRUCTURE

BACKGROUND OF THE INVENTION

1. Field of the Invention

The present invention relates to an engine mounting for suspending an engine relative to a vehicle structure.

2. Description of the Prior Art

In an automotive vehicle, the elastic block structures employed for the suspension of an engine relative to the vehicle structure have a principal function to restrain low frequency vibrations falling within a vibration restrained domain. In this respect, the block structures must have a high dynamic spring constant (high stiffness) suitable for restraining such vibrations. Unfortunately, this high stiffness suitable for restraining such low frequency vibrations results in a considerable reduction in passenger comfort under the effect of high frequency vibrations falling within a vibration insulated domain.

The conventional elastic block structures are set to exhibit a characteristic as represented by a broken line curve as shown in FIG. 3. With the conventional engine mounting employing the elastic blocks, since the dynamic spring constant of the elastic blocks is set high enough to restrain or attenuate low frequency vibrations (between 5 and 30 Hz) produced by an uneven road surface or by engine idling upon its idling operation, the high frequency vibrations (above 30 Hz) due to engine operation above the idle speed are not insulated or filtered satisfactorily. On the other hand, if the dynamic spring constant is set high enough to insulate or filter the high frequency vibrations having frequencies above 30 Hz, the low frequency vibrations are not restrained or attenuated satisfactorily. Therefore, the elastic block structures cannot meet both requirements, that is, restraining the low frequency vibrations within the vibration restrained domain and insulating the high frequency vibrations within the vibration insulated domain.

SUMMARY OF THE INVENTION

According to the present invention, an engine mounting for suspending an engine relative to a vehicle structure is provided which comprises: a first armature for connection to the engine and a second armature for connection to a vehicle structure and a bellows interposed between the two armatures and defining therewith a closed enclosure, the closed enclosure being filled with pressurized gas, and an inertia mass mounted on the bellows. The mass of the inertia mass and the apparent spring constant of the bellows are selected such that the inertia mass vibrates in inverse phase relationship with the phase of vibration of the first armature when the engine is in operation within a vibration insulated domain.

The engine mounting according to the present invention provides a sufficiently high spring constant under the effect of low frequency vibrations falling within a vibration restrained domain because the inertia mass vibrates in the same phase relationship with the phase of vibrations of the first armature.

The dynamic spring constant of the bellows can be increased by mounting partition wall means defining an orifice within the bellows. The partition wall means divides the closed enclosure into a first chamber and a second chamber.

The dynamic spring constant of the bellows is increased by increasing the thickness of each of the hinges of the bellows between the first armature and the inertia mass and between the second armature and the inertia mass, respectively. The thickened hinges constitute stops which are compressed under the effect of low frequency vibrations falling within the vibration restrained domain, providing resistance to compression of the bellows, thus providing a high dynamic spring constant. The stops are left uncompressed under the effect of high frequency vibrations falling within the vibration insulated domain, thus providing the bellows with a low dynamic spring constant.

BRIEF DESCRIPTION OF THE DRAWINGS

The features and advantages of the engine mounting according to the present invention will be more clearly appreciated from the following description taken in conjunction with the accompanying drawings in which like reference numerals designate corresponding elements, and in which.

DETAILED DESCRIPTION OF THE INVENTION

Figure 1:
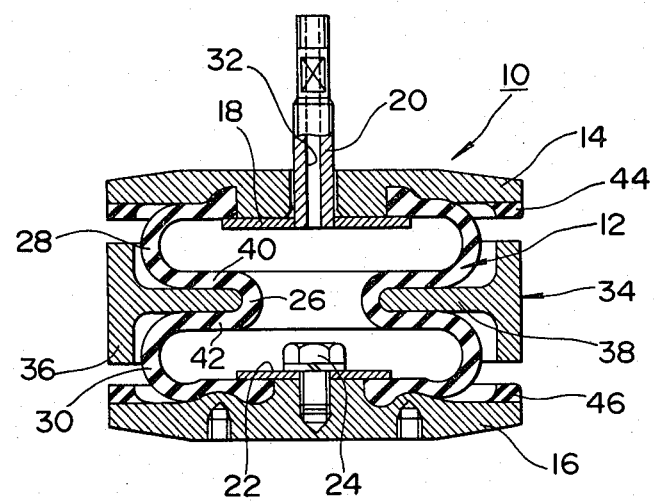
FIG. 1 is a sectional view of a first embodiment of an engine mounting according to the present invention.

Referring to FIG. 1, an engine mounting according to the present invention is generally denoted by the reference numeral 10 which generally comprises an elastic bellows 12 interposed between a first or upper armature 14 for connection to an engine, a second or lower armature 16 for connection to a vehicle structure, that is, a vehicle body in this embodiment. The elastic bellows has an upper end clamped between the armature 14 and a retainer plate 18 which is pressed against the armature 14 by a stud bolt 20 threadedly engaged with the armature 14 to extend therethrough. The lower end of the bellows 12 is clamped between the armature 16 and a retainer plate 22 which is pressed against the armature 16 by a stud bolt 24 threadedly engaged with the armature 16. Therefore, the bellows 12 interposed between the two armatures 14 and 16 defines therewith a closed enclosure. The bellows has a waist portion 26 between an upper radially extending hinge 28 and a lower radially extending hinge 30. The stud bolt 20 is formed with an air supply passage 32 through which air is fed into the interior of the bellows 12 under pressure, so that the bellows 12 acts as an air spring.

An inertia mass 34 is mounted on the bellows 12. The inertia mass 12 has a ring portion 36 having a radially inwardly extending portion 38 fitted around the waist portion 26 in a manner to be clamped between the opposing wall portions 40 and 42 of the bellows 12 so that the mass of the inertia mass 34 is imparted to the waist portion 26 of the bellows 12.

Air pressure within the bellows 12 and the mass of the inertia mass 34 are appropriately chosen such that in respect of vibrations within a vibration insulated domain coming from the engine upon its operation above an idle speed, the phase of vibrations of the inertia mass 34 is in inverse relationship to the phase of vibrations of the armature 14 connected to the engine. In order to prevent excessively great amplitude of displacement of the inertia mass 34, an annular stop rubber 44 is attached to the peripheral portion of the armature 14 and a similar annular stop rubber 46 is attached to the outer peripheral portion 46 of the armature 16.

The engine mounting just described operates in the following manner.

In the case of a 4-cycle reciprocatory in line multi-cylinder engine, the main components of vibrations of the armature 14 have amplitudes expressed by the n/2th power of a given engine speed (n: the number of cylinders) when the engine operates at engine speeds higher than 1,000 rpm, that is, when the engine operates within a vibration insulated domain. The transmission rate of the vibrations of the armature 14 to the armature 16 connected to the vehicle structure is determined by the internal pressure of the bellows 12 and the effective pressure acting area through which the bellows 12 contacts with the armature 16. The effective pressure acting area through which the bellows 12 contacts with the armature 16 is variable dependent upon the movement of the inertia mass 34. The movement of the inertia mass 34 is determined by the mass m, the flexibility of the bellows 12, and the internal pressure acting through an effective pressure acting area of the bellows 12 to the inertia mass 34.

The displacement ($x_2$) of the inertia mass 34 can be derived from the following equation:

$$mx_2 = k_2(x_1 - x_2) - k_2 x_2$$
$$= k_2(x_1 - 2x_2)$$
$$\therefore mx_2 + 2k_2 x_2 = k_2 x_1$$

Thus, $x_2 = \dfrac{\frac{1}{2}}{1 - (w/w_o)^2} x_1$ where:
$x_1$: displacement of armature 14
$x_2$: displacement of inertia mass 34
m: mass of inertia mass 34
$k_1$: spring constant between the two armatures 14 and 16 provided by pressurized air within bellows 12
$k_2$: apparent spring constant of bellows 12 retaining inertia mass 34, the apparent spring constant being determined by flexibility of bellows 12 and the internal pressure within the bellows 12 acting through effective pressure acting area to the inertia mass 34
$w_o = \sqrt{2k_2/m}$: (natural angular frequency of the inertia mass 34 or the resonant frequency)
w: angular frequency of vibration imparted to armature 14

The alternate force F transmitted to the armature 16 can be expressed as follows:

$$F = k_1 x_1 + k_2 x_2$$
$$= \left( k_1 + \dfrac{\frac{1}{2}}{1 - (w/w_o)^2} \right) x_1$$

The amplitude of the alternate force F transmitted to the armature 16 is therefore expressed as:

$$|F| = \left| \left( k_1 + \dfrac{\frac{1}{2}}{1 - (w/w_o)^2} \right) x_1 \right|$$

Figure 2:
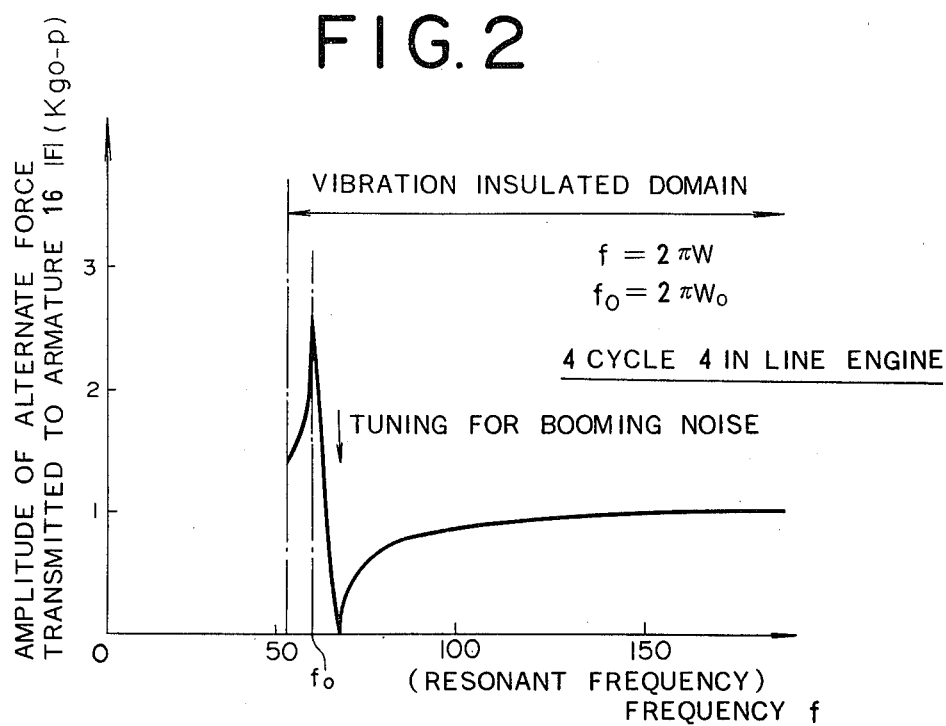
FIG. 2 is a graph showing a relationship between amplitude of alternate force transmitted to vehicle structure vs. angular frequency.

The amplitude of the alternate force F transmitted to the armature 16 connected to the vehicle structure is plotted in FIG. 2 when the engine operates within the vibration insulated domain.

Figure 3:
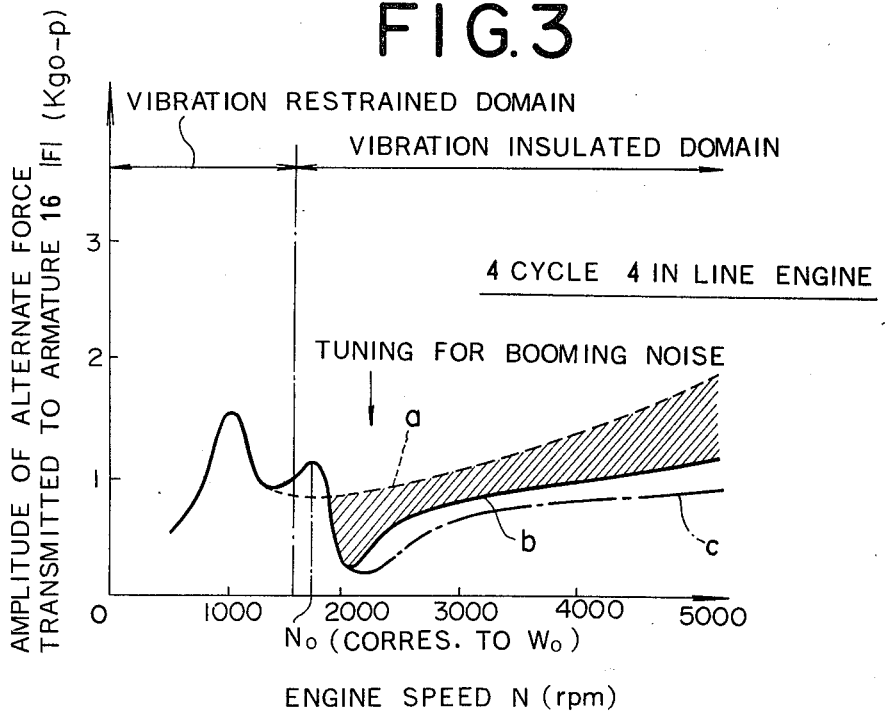
FIG. 3 is a graph showing a relationship between amplitude of alternate force transmitted to vehicle structure vs. engine speed.

The natural angular frequency (or resonant frequency) $w_o$ of the inertia mass 34 that is determined by the mass m of the inertia mass 34 and the apparent spring constant $k_2$ of the bellows 12 is adjusted to correspond to the minimum engine speed of the vibration insulated domain, that is, 1,000 rpm (No) in this embodiment, so that within the vibration insulated domain, the inertia mass 34 can vibrate in inverse phase relationship with the phase of vibration of the armature 14 connected to the engine. As a result, the effective pressure acting area through which the bellows 12 contacts with the armature 16 connected to the vehicle structure varies alternately and in inverse phase relationship with the phase of a variation in the internal pressure within the bellows 12 which internal pressure varies alternately in the same phase relationship with the phase of vibration of the armature 14 connected to the engine. This causes an effective reduction in alternate force transmitted to the armature 16 connected to the vehicle structure as shown by solid curve b in FIG. 3.

Under the effect of the vibrations falling within the vibration restrained domain and of a frequency of the order of 5 to 30 Hz, which vibrations are produced by the unevenness of the surface of the road or by the engine upon idling, the inertia mass 34 vibrates in the same phase relationship with the phase of vibration of the armature 14. Thus, the stiffness of the engine mounting 10 appreciably increases, thus restraining the vibrations.

Figure 4:
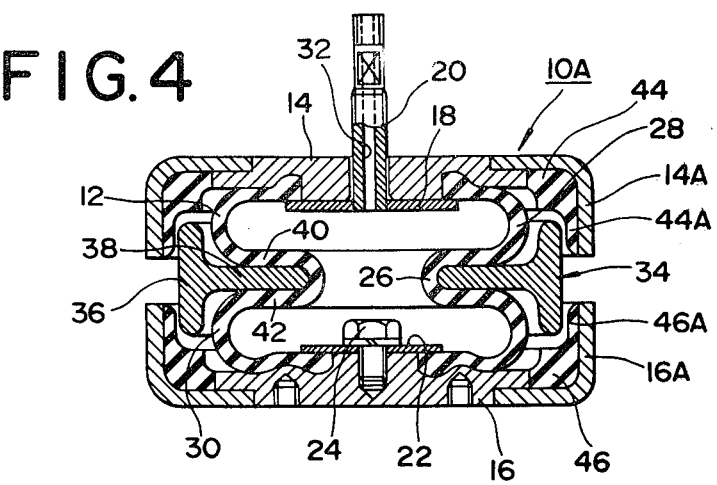
FIG. 4 is a sectional view of a second embodiment.

An engine mounting 10A shown in FIG. 4 differs from the foregoing structure only in the presence of a stop arrangement for limiting excessive displacement of an inertia mass 34 in radial directions whereby to limit movement of the inertia mass 34 in forward and rearward direction of the vehicle and in leftward and rightward direction.

Referring to the embodiment shown in FIG. 4, the armature 14 and the armature 16 have their peripheral edges curved toward each other to form short sleeves 14A and 16A which partially surround the ring section 36 of the inertia mass 34 and the annular stop rubbers 44 and 46 have portions 44A and 46A extending to cover the inside walls of the short sleeves 14A and 16A. The extending portions 14A and 16A abut the ring section 36 of the inertia mass 34 when the inertia mass moves excessively in one of the radial directions, thereby preventing such excessive displacement of the inertia mass 34 relative to the armature 16 connected to the vehicle structure.

As described above, according to the present invention, since, within the vibration insulated domain, the inertia mass 34 vibrates with a phase which is in inverse phase relationship with the phase of the vibration of the armature 14 on which the vibration of the engine is directly imparted, the amplitude of alternate force F transmitted to the armature 16 connected to the vehicle structure is considerably decreased, resulting in a considerable reduction in the vehicle interior noise.

Figure 5:
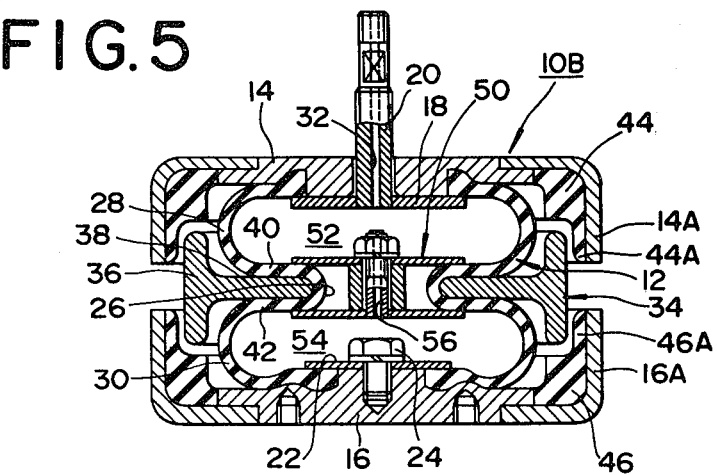
FIG. 5 is a sectional view of a third embodiment.

An engine mounting 10B shown in FIG. 5 differs from the embodiment in FIG. 4 only in the provision within a bellows 12 partition wall means 50 which divides the interior of the bellows 12 into an upper chamber 52 and a lower chamber 54. The partition wall means defines an orifice 56 providing communication between the upper and lower chamber 52 and 54.

The alternating force F transmitted to the armature 16 can be expressed as:

$$F = (k_1 x_1) + (k_2 x_2 + C_2 \dot{x}_2)$$

where: $C_2$ is the damping coefficient at which the vibration of inertia mass 34 is damped owing to the orifice 56.

The operation of the engine mounting 10B is substantially the same as that of the engine mounting 10A shown in FIG. 4.

Under the effect of low frequency vibrations falling within the vibration restrained domain, the inertia mass vibrates in the same phase relationship with the phase of vibrations of the armature 14 and since the dynamic spring constant of the engine mounting is increased owing to the damping effect of the orifice 56, the low frequency vibrations are effectively restrained.

Under high frequency vibrations falling within the vibration insulated domain, an increase in dynamic spring constant of the engine mounting owing to the delay in transfer of pressure change between the two chambers 52 and 54 tends to occur, but this tendency can be eliminated if the mass m of the inertia mass 34 and the apparent spring constant of the bellows 12 are chosen appropriately. This ensures the vibrations of the inertia mass 34 in inverse phase relationship with the vibration of the armature 14 under the vibrations of the armature 14 falling within the vibration insulated domain, thus resulting in a considerable decrease in the amplitude of the alternate force F transmitted to the armature 16 connected to the vehicle structure, as shown by a curve C in FIG. 3.

In the case of the just described embodiment, a high dynamic spring constant is provided during operation within the vibration restrained domain, while, during operation within the vibration insulated domain a low dynamic spring constant is provided, thus resulting in a considerable reduction in vehicle interior noise.

Figure 6:
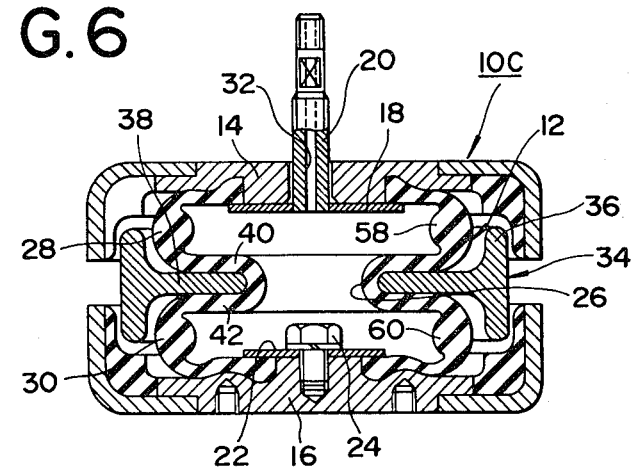
FIG. 6 is a sectional view of a fourth embodiment.

The engine mounting 10C shown in FIG. 6 differs from the embodiment shown in FIG. 4 only in the provision of stops 58 and 60, each of which is constituted by increasing the thickness of the wall of one of an upper hinge 28 and a lower hinge 30 of the bellows 12, so as to provide a high dynamic spring constant of the bellows 12 under the low frequency vibrations falling within the vibration restrained domain because the stops 58 and 60 are compressed to provide resistance to compressive movement of the engine mounting, and so as to provide a low dynamic spring constant under the high frequency vibrations falling within the vibration insulated domain because the stops 58 and 60 are left uncompressed under these vibrations. Thus, a considerable reduction in amplitude of alternate force transmitted to the armature 16 is obtained as appreciated from a curve c shown in FIG. 3.

According to this embodiment, under low frequency vibrations falling within the vibration restrained domain, the inertia mass 34 vibrates in the same phase relationship with the phase of vibration of the armature 14 and the stops 58 and 60 are compressed to provide a resistance to compression of the bellows 12, thus providing a sufficiently high dynamic spring constant to restrain the low frequency vibrations, while, under high frequency vibrations falling within vibration insulated domain, the inertia mass 34 vibrates in inverse phase relationship with the phase of the armature 14 connected to the engine and the stops 58 and 60 are left uncompressed not to provide any resistance to compression of the bellows 12, thus providing a sufficiently small low dynamic spring constant, thus effectively insulating the vibrations, with the consequent result that the vehicle interior noise is greatly reduced.

What is claimed is:

1. In a vehicle,
   an engine;
   a vehicle structure;
   a first armature connected to the engine for movement therewith;
   a second armature connected to said vehicle structure for movement therewith;
   an elastic bellows having one end securely connected to said first armature and an opposite end securely connected to said second armature and defining therewith a closed chamber;
   said elastic bellows having a waist portion, a first hinge portion radially extending from said one end thereof and said waist portion, and a second hinge portion radially extending from said opposite end thereof and said waist portion thereof;
   an inertia mass mounted on and around said waist portion of said bellows for movement therewith, said inertia mass having a ring section and a radially inwardly extending section fitted and received in said waist portion of said bellows;
   a gas contained in said closed enclosure under pressure;
   a mass of said inertia mass and an apparent spring constant of said elastic bellows being selected such that said inertia mass vibrates in the same phase as the phase of vibration of said first armature when the engine operates at speeds below a predetermined revolution speed, whereas said inertia mass vibrates in inverse phase relationship with the phase of vibration of said first armature when the engine operates at speeds above said predetermined revolution speed;
   said second armature having an area wider than a cross-sectional area of said second hinge portion radially extending from said opposite end and said waist portion thereof to provide an arrangement whereby when said inertia mass vibrates in inverse phase relationship with the phase of vibration of said first armature, an effective pressure acting area through which said elastic bellows contacts with said second armature varies alternately and in inverse phase relationship with the phase of a variation in the pressure of said gas contained in said closed enclosure which pressure varies in the same phase relationship with the phase of vibration of said first armature;
   each of said first and second armatures having an annular resilient stop attached thereto which abuts with said ring section of said inertia mass to limit excessive axial displacement of said inertia mass;
   said first and second armatures having sleeve portions, respectively, and said stops having portions extending to cover inner walls of said sleeves, respectively, to abut said ring section of said inertia mass to limit excessive radial displacement of said inertia mass.

2. An engine mounting as claimed in claim 1, further comprising partition wall means mounted within said bellows and defining an orifice and dividing said closed enclosure into two chambers.

3. An engine mounting as claimed in claim 1 wherein the thickness of each of said first and second hinge portions of said bellows is increased to constitute a stop which is compressed to resist a compression movement of said bellows, said stops being compressed to resist compression of said bellows under the effect of low frequency vibrations falling within said vibration restrained domain, said stops are compressed to provide resistance to compression of said bellows thus providing a high dynamic spring constant, while, said stops being left uncompressed under the effect of high frequency vibrations falling within said vibration insulated domain, said stops are left uncompressed, thus providing a low dynamic spring constant.

4. An engine mounting as claimed in claim 1, wherein said vibration restrained domain is when the engine operates at speeds lower than a predetermined engine speed, and said vibration insulated domain is when the engine operates at speeds higher than said predetermined engine speed.

* * * * *